United States Patent [19]

Twede

[11] Patent Number: 5,086,953
[45] Date of Patent: Feb. 11, 1992

[54] SELF METERING COUNTERSINK SEALANT TIP

[75] Inventor: Shane K. Twede, Bellevue, Wash.

[73] Assignee: The Boeing Company, Seattle, Wash.

[21] Appl. No.: 506,725

[22] Filed: Apr. 9, 1990

[51] Int. Cl.5 .................. B65D 88/54; G01F 11/28
[52] U.S. Cl. ............................ 222/322; 222/453; 222/501
[58] Field of Search ............ 222/322, 501, 476, 453, 222/450, 451; 401/235, 264; 118/241, 254; 156/578, 293, 294; 29/326, DIG. 1

[56] References Cited

U.S. PATENT DOCUMENTS

| | | | |
|---|---|---|---|
| 997,939 | 7/1911 | Wahl | 222/322 |
| 2,624,902 | 1/1953 | Soldner | 222/501 X |
| 2,628,005 | 2/1953 | Keeshan | 222/501 X |
| 3,064,620 | 11/1962 | Bornemann | 118/241 X |
| 3,072,302 | 1/1963 | Giovannoni et al. | 222/453 X |
| 3,105,554 | 5/1963 | McCall | 118/254 X |
| 3,183,887 | 5/1965 | Derderian | 222/501 X |
| 3,416,499 | 12/1968 | Wilmot | 222/501 X |
| 3,421,701 | 1/1969 | Walters | 118/254 X |
| 3,791,590 | 2/1974 | Dieter | 222/501 X |
| 4,280,864 | 7/1981 | Bromberg | 156/578 X |
| 4,541,552 | 9/1985 | Scheithauer | 222/453 X |
| 4,607,766 | 8/1986 | Jones | 222/453 X |

FOREIGN PATENT DOCUMENTS 966994 10/1950 France ............... 222/501

Primary Examiner—Michael S. Huppert
Assistant Examiner—Kenneth DeRosa
Attorney, Agent, or Firm—Conrad O. Gardner; B. A. Donahue

[57] ABSTRACT

A self metering countersink sealant tip for dispensing sealant in a ring like pattern on the inside surface of a countersunk hole. The seal tip with a pilot and an integral shoulder has two check valves that are utilized on a one step operation for dispensing a metered sealant ring.

1 Claim, 2 Drawing Sheets

SELF METERING COUNTERSINK SEALANT TIP

BACKGROUND OF THE INVENTION

The invention relates to a method and apparatus for dispensing sealant in a countersunk hole prior to fastener installation and more particularly to an applicator tip for dispensing a predetermined amount of sealant in a ring like pattern on the countersink surface.

Many countersunk fasteners on aircraft structures require sealant to be applied to countersunk holes prior to fastener insertion. This is done to keep air and fluids from passing around the fasteners.

U.S. Pat. No. 4,144,625 describes a sealant applicator system where the applicator tip is dipped into a sealant supply then centered, pressed and rotated onto a countersink surface. The rotation of the tip provides a deposit of sealant onto the countersink surface.

U.S. Pat. No. 3,350,774 also describes a sealant applicator for fasteners. An ejector is shown for releasing a predetermined metered quantity of sealant in a uniform manner. The shape and size of the sealant deposit is not controlled.

Presently available sealant tips dispense the sealant into the holes and not onto the countersink thereby not sealing the underside of the countersink head which tends to lead to leaking and corrosion. In addition, the pintails and threads of the fasteners get sealant on them thereby leading to erroneous torque values and clogging of fastener installation tools. Present tips do not meter therefore excessive sealant is used resulting in waste and cleanup time using costly chemicals. Also associated with existing tips is the tendency toward physical fatigue and wrist injuries of the operator due to constant manual twisting of the seal tip in an attempt to cover the entire countersink surface with sealant and actuating the air valve of the air gun coupled to and driving the sealant through the dispensing sealant tip.

DESCRIPTION OF THE PREFERRED EMBODIMENT

Figure 1:
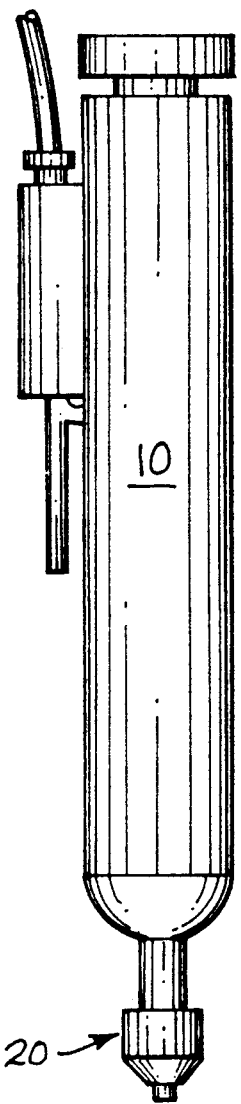
FIG. 1 is a side view in perspective of an automatic air powered sealant gun driving the present sealant tip.
Figure 2:
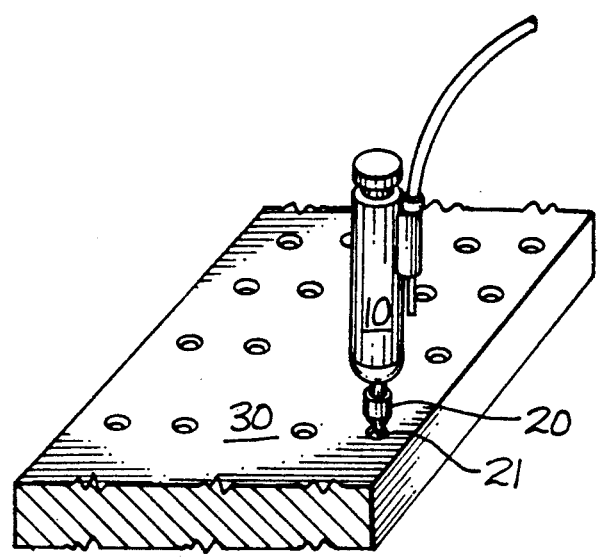
FIG. 2 is a view in perspective of the automatic air powered sealant gun and sealant tip of FIG. 1 shown centered above a countersunk hole in a workpiece.
Figure 3:
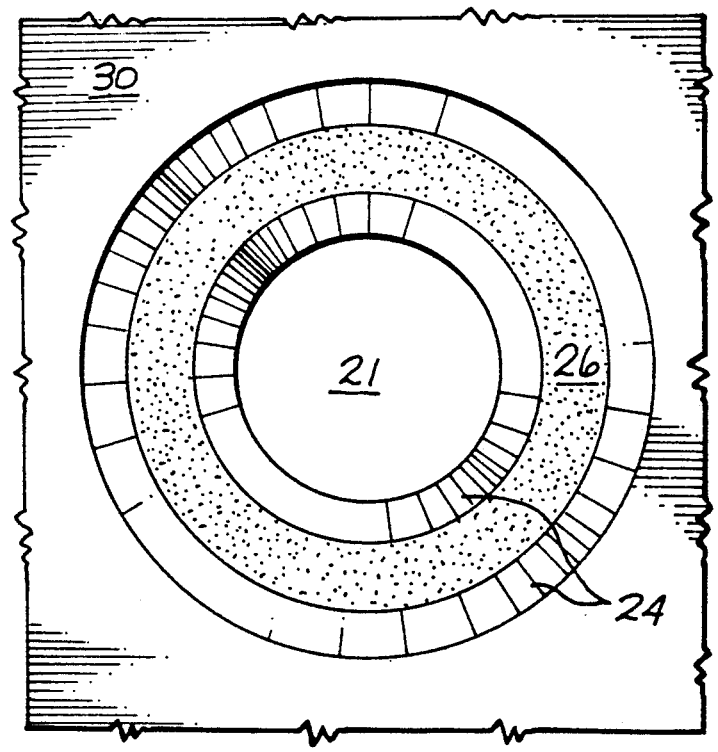
FIG. 3 shows a top view looking into the countersink of a drilled hole in the workpiece of FIG. 2 illustrative of the dispensed sealant ring afforded by the apparatus of FIGS. 1 and 2; and, FIG. 4 is an exploded view in detail of the apparatus of FIGS. 1 and 2 showing the manner of dispensing the sealant ring shown in FIG. 3.

Turning now to FIGS. 1 and 2 it can be seen that the present air powered sealant gun 10 utilizes a self metering sealant tip 20 which is positioned over a drilled hole 21 in workpiece 30 having countersink 24 (see FIG. 3) around which is dispensed a sealant having a ring like pattern 26.

Figure 4:
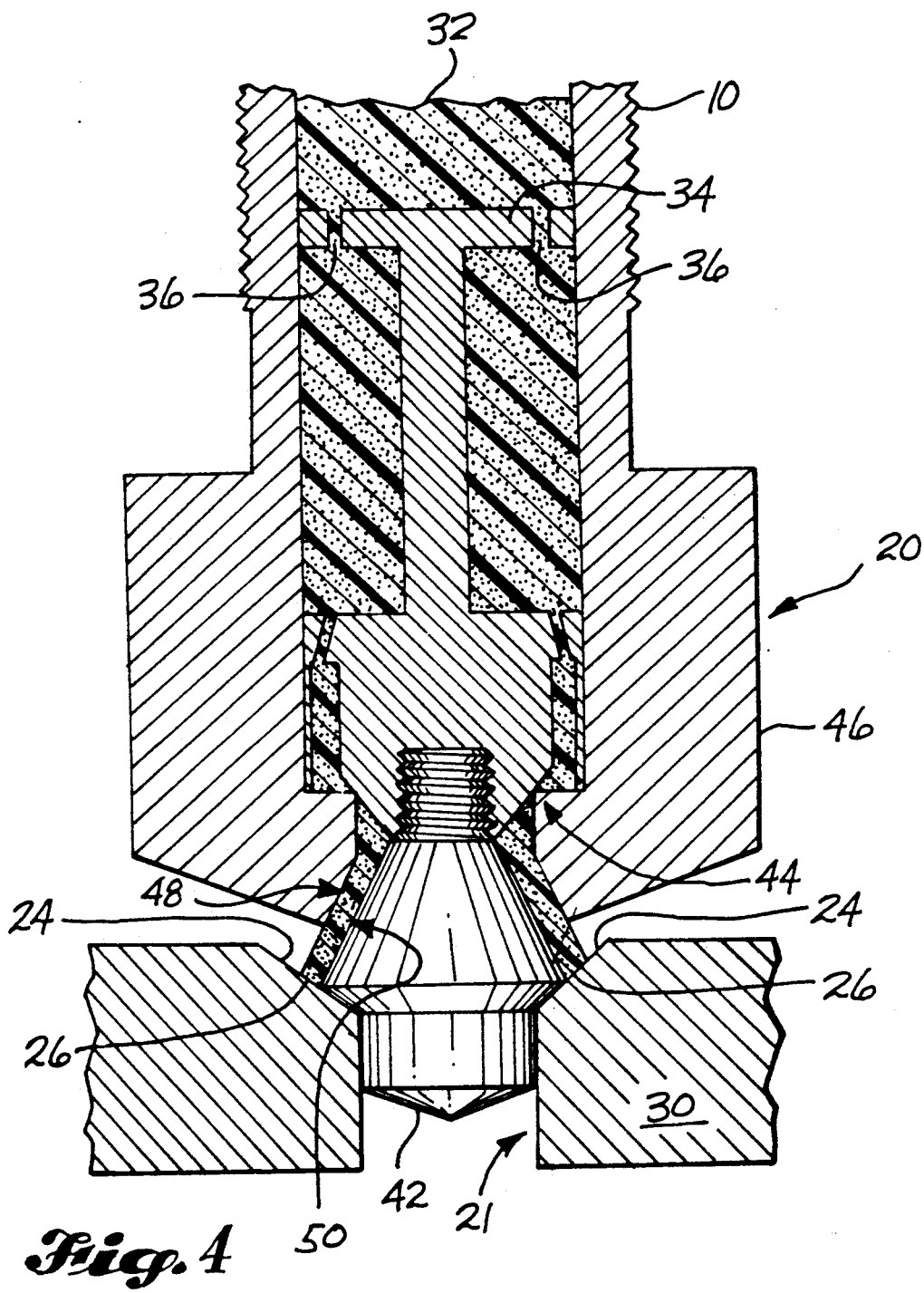

The present seal tip assembly 20 is shown in detail in exploded cross sectional view in FIG. 4 dispensing sealant in a ring like pattern 26 about the inner surface of countersink 24. Seal tip assembly 20 is coupled to air powered sealant gun 10 which propels sealant 32 under pressure. Sealant 32 is prevented from entering drilled hole 21 by pilot portion 42 at the end of seal tip assembly 20 and instead sealant is displaced by the integral shoulder 50 attached to the pilot portion 42 and is deposited in ring like pattern 26. Sealant tip assembly 20 utilizes a plunger 34 having a plurality of metering orifices 36. With sealant tip assembly 20 attached to air powered sealant gun 10 and sealant pressure applied, plunger 34 is forced downward (in the direction of the workpiece 30) a first check valve formed by first seat portion 44 in housing 46 of sealant tip assembly 20 thereby stopping sealant flow.

When end pilot portion 42 is pushed into hole 21 so as to engage countersink 24, pilot portion 42 then becomes displaced to second seat portion 48 forming a second check value in housing 46 of sealant tip assembly 20. This movement permits a predetermined amount of sealant to flow and be dispensed in a ring like pattern 26 into countersunk surface 24. When seal tip assembly 20 is removed from drilled hole 21, sealant pressure pushes down plunger 34 and the flow of sealant is again stopped and prevented from escaping because of first seat portion 44 and sealant tip assembly 20 is ready for use by the operator in sealing the next hole.

As hereinabove described it can be seen that the present sealant tip assembly 20 utilizes a one step operation by the operator for dispensing a metered sealant ring onto the countersunk surface of holes.

Constant sealant pressure from air powered sealant gun 10 can be used with the present sealant tip assembly 20 since the present sealant tip assembly 20 automatically shuts off and turns on the sealant flow with the removal of and insertion of the sealant tip assembly from the countersunk workpiece.

What is claimed is:

1. A self metering countersink sealant tip assembly comprising in combination:
   a plunger having central axis and a plurality of metering orifices;
   a housing circumferentially disposed about said plunger;
   a pilot portion coaxially disposed with respect to the central axis of said plunger an integral shoulder attached to said pilot coaxially disposed with respect to the central axis of said pilot said integral shoulder having an upward taper;
   said housing having first and second seat portions for providing first and second check valves;
   said first and second check valves controlling the flow of sealant from said self metering countersink sealant assembly.

* * * * *